(12) United States Patent
Hou et al.

(10) Patent No.: US 10,330,818 B2
(45) Date of Patent: Jun. 25, 2019

(54) MULTI-COMPONENT INDUCTION LOGGING SYSTEMS AND METHODS USING REAL-TIME OBM BOREHOLE CORRECTION

(75) Inventors: Junsheng Hou, Humble, TX (US); Luis E. San Martin, Houston, TX (US); Dagang Wu, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 872 days.

(21) Appl. No.: 14/355,289

(22) PCT Filed: Oct. 31, 2011

(86) PCT No.: PCT/US2011/058619
§ 371 (c)(1),
(2), (4) Date: Apr. 30, 2014

(87) PCT Pub. No.: WO2013/066297
PCT Pub. Date: May 10, 2013

(65) Prior Publication Data
US 2014/0324353 A1    Oct. 30, 2014

(51) Int. Cl.
*G01V 3/38*   (2006.01)
*G01V 3/28*   (2006.01)

(52) U.S. Cl.
CPC . *G01V 3/38* (2013.01); *G01V 3/28* (2013.01)

(58) Field of Classification Search
CPC ... G01V 3/38; G01V 3/28; G01V 1/40; G01V 3/18
See application file for complete search history.

(56) References Cited

U.S. PATENT DOCUMENTS

| | | |
|---|---|---|
| 4,980,643 A | 12/1990 | Gianzero et al. |
| 5,389,881 A | 2/1995 | Bittar et al. |

(Continued)

FOREIGN PATENT DOCUMENTS

| | | |
|---|---|---|
| EP | 1315984 | 1/2011 |
| EP | 1155343 | 3/2011 |

(Continued)

OTHER PUBLICATIONS

Moran, J. H., et al., "Effects of Formation Anisotropy of Resistivity-Logging Measurements", Geophysics, vol. 44, No. 7, (Jul. 1979), p. 1266-1286, 21 Figs., 4 Tables.

(Continued)

*Primary Examiner* — Mohamed Charioui
*Assistant Examiner* — Jeremy A Delozier
(74) *Attorney, Agent, or Firm* — Benjamin Fite; C. Tumey Law Group PLLC (57) ABSTRACT

Various resistivity logging tools, systems, and methods are disclosed. At least some system embodiments include a logging tool and at least one processor. The logging tool provides transmitter-receiver coupling measurements that include at least direct coupling along the longitudinal tool axis (Czz), direct coupling along the perpendicular axis (Cxx or Cyy), and cross coupling along the longitudinal and perpendicular axes (Cxz, Cyz, Czx, or Czy). The processor combines a plurality of the coupling measurements to obtain inversion parameters. Based at least in part on the inversion parameter, the processor performs an inversion process to determine a vertical conductivity and, based in part on the vertical conductivity, determines borehole corrected values for said transmitter-receiver coupling measurements. One or more of the borehole corrected values can be provided as a function of borehole position.

24 Claims, 10 Drawing Sheets

(56) References Cited

U.S. PATENT DOCUMENTS

| | | |
|---|---|---|
| 5,511,037 A | 4/1996 | Randall et al. |
| 5,869,968 A | 2/1999 | Brooks et al. |
| 5,999,883 A | 12/1999 | Gupta et al. |
| 6,163,155 A | 12/2000 | Bittar |
| 6,191,586 B1 | 2/2001 | Bittar |
| 6,218,842 B1 | 4/2001 | Bittar |
| 6,353,321 B1 | 3/2002 | Bittar |
| 6,359,438 B1 | 3/2002 | Bittar |
| 6,393,364 B1 | 5/2002 | Gao et al. |
| 6,476,609 B1 | 11/2002 | Bittar |
| 6,538,447 B2 | 3/2003 | Bittar |
| 6,556,015 B1 | 4/2003 | Omeragic et al. |
| 6,591,194 B1 | 7/2003 | Yu et al. |
| 6,618,676 B2 | 9/2003 | Kriegshauser et al. |
| 6,624,634 B2 | 9/2003 | Rosthal et al. |
| 6,693,430 B2 | 2/2004 | Rosthal et al. |
| 6,810,331 B2 | 10/2004 | Bittar et al. |
| 6,819,112 B2 | 11/2004 | Gianzero et al. |
| 6,885,943 B2 | 4/2005 | Bittar et al. |
| 6,911,824 B2 | 6/2005 | Bittar |
| 6,944,546 B2 | 9/2005 | Xiao et al. |
| 7,019,528 B2 | 3/2006 | Bittar |
| 7,046,010 B2 | 5/2006 | Hu et al. |
| 7,076,370 B1 | 7/2006 | Freedman et al. |
| 7,098,664 B2 | 8/2006 | Bittar et al. |
| 7,098,858 B2 | 8/2006 | Bittar et al. |
| 7,138,897 B2 | 11/2006 | Minerbo et al. |
| 7,227,363 B2 | 6/2007 | Gianzero et al. |
| 7,265,552 B2 | 9/2007 | Bittar |
| 7,345,487 B2 | 3/2008 | Bittar et al. |
| 7,427,863 B2 | 9/2008 | Bittar |
| 7,557,579 B2 | 7/2009 | Bittar |
| 7,557,580 B2 | 7/2009 | Bittar |
| 7,629,791 B2 | 12/2009 | Bespalov et al. |
| 7,659,722 B2 | 2/2010 | Bittar |
| 7,746,078 B2 | 6/2010 | Bittar et al. |
| 7,778,778 B2 | 8/2010 | Bespalov et al. |
| 7,839,148 B2 | 11/2010 | Vehra et al. |
| 7,839,346 B2 | 11/2010 | Bittar et al. |
| 7,948,238 B2 | 5/2011 | Bittar |
| 7,982,464 B2 | 7/2011 | Bittar et al. |
| 8,030,937 B2 | 10/2011 | Hu et al. |
| 8,085,049 B2 | 12/2011 | Bittar et al. |
| 8,085,050 B2 | 12/2011 | Bittar et al. |
| 8,174,265 B2 | 5/2012 | Bittar |
| 8,200,437 B2 | 6/2012 | Davydycheva et al. |
| 8,222,902 B2 | 7/2012 | Bittar et al. |
| 8,264,228 B2 | 9/2012 | Bittar et al. |
| 8,274,289 B2 | 9/2012 | Bittar et al. |
| 8,347,985 B2 | 1/2013 | Bittar et al. |
| 8,571,797 B2 | 10/2013 | Wu et al. |
| 8,636,061 B2 | 1/2014 | Mosse et al. |
| 9,364,905 B2 | 6/2016 | Hou et al. |
| 2005/0024060 A1 | 2/2005 | Bittar |
| 2005/0256642 A1* | 11/2005 | Barber ............ G01V 3/38 702/6 |
| 2007/0075455 A1 | 4/2007 | Marini et al. |
| 2007/0235225 A1 | 10/2007 | Bittar |
| 2008/0033654 A1 | 2/2008 | Bespalov et al. |
| 2010/0156424 A1* | 6/2010 | Bittar ............ G01V 3/28 324/339 |
| 2010/0198569 A1 | 8/2010 | Wu et al. |
| 2010/0262370 A1 | 10/2010 | Bittar et al. |
| 2010/0284250 A1 | 11/2010 | Cornish et al. |
| 2011/0006773 A1 | 1/2011 | Bittar |
| 2011/0161009 A1 | 6/2011 | Wang |
| 2011/0175899 A1 | 7/2011 | Bittar et al. |
| 2011/0180327 A1 | 7/2011 | Bittar et al. |
| 2011/0186290 A1 | 8/2011 | Roddy et al. |
| 2011/0187556 A1 | 8/2011 | Roddy et al. |
| 2011/0192592 A1 | 8/2011 | Roddy et al. |
| 2011/0199088 A1 | 8/2011 | Bittar |
| 2011/0199228 A1 | 8/2011 | Roddy et al. |
| 2011/0204897 A1 | 8/2011 | Hu et al. |
| 2011/0221443 A1 | 9/2011 | Bittar et al. |
| 2011/0234230 A1 | 9/2011 | Bittar et al. |
| 2011/0251794 A1 | 10/2011 | Bittar et al. |
| 2011/0298461 A1 | 12/2011 | Bittar et al. |
| 2011/0308794 A1 | 12/2011 | Bittar et al. |
| 2011/0308859 A1 | 12/2011 | Bittar et al. |
| 2011/0309836 A1 | 12/2011 | Bittar et al. |
| 2012/0001637 A1 | 1/2012 | Bittar et al. |
| 2012/0024600 A1 | 2/2012 | Bittar et al. |
| 2012/0133367 A1 | 5/2012 | Bittar et al. |
| 2012/0186873 A1 | 7/2012 | Shayegi et al. |
| 2012/0199394 A1 | 8/2012 | Bittar et al. |
| 2012/0234605 A1 | 9/2012 | Donderici et al. |
| 2012/0249149 A1 | 10/2012 | Bittar et al. |
| 2013/0073206 A1 | 3/2013 | Hou et al. |
| 2016/0274263 A1 | 9/2016 | Hou et al. |

FOREIGN PATENT DOCUMENTS

| | | |
|---|---|---|
| EP | 2510385 | 10/2012 |
| GB | 2379989 | 3/2003 |
| WO | WO-2007/149106 | 12/2007 |
| WO | WO-2008/008386 | 1/2008 |
| WO | WO-2008/021868 | 2/2008 |
| WO | WO-2008/076130 | 6/2008 |
| WO | WO-2008/115229 | 9/2008 |
| WO | WO-2009/091408 | 7/2009 |
| WO | 2011/012379 | 10/2011 |
| WO | WO-2011/123379 | 10/2011 |
| WO | WO-2011/129828 | 10/2011 |
| WO | WO-2012/005737 | 1/2012 |
| WO | WO-2012/008965 | 1/2012 |
| WO | WO-2012/064342 | 5/2012 |
| WO | WO-2013/025222 | 2/2013 |
| WO | WO-2013/066297 | 5/2013 |

OTHER PUBLICATIONS

PCT International Search Report and Written Opinion, dated Jun. 1, 2011, Application No. PCT/US2011/030145, "Multi-Step Borehole Correction Scheme for Multi-Component Induction Tools", filed Mar. 28, 2011, 8 pgs.

Sun, X. et al., "Analysis and Correction of Borehole Effect on the Responses of Multicomponent Induction Logging Tools", Progress in Electromagnetics Research, PIER 85, URL <http://www.jpier.org/PIER/pier85/11.08072206.pdf>, (2008), pp. 211-226.

Wu, P. et al., "Borehole Effects and Correction in OBM With Dip and Anisotrophy for Triaxial Induction Tools", Society of Petroleum Engineers Annual Technical Conference and Exhibition; SPE 110623-MS; (Nov. 2007), 20 pgs, Anaheim, CA, U.S.A.

Wang, Hanming et al., "Triaxial Induction Logging: Theory, Modeling, Inversion, and Interpretation", Society of Petroleum Engineers International Oil & Gas Conference and Exhibition; SPE 103897-MS, (Dec. 2006),19 pgs., Beijing, China.

PCT International Search Report and Written Opinion, dated Mar. 16, 2012, Appl No. PCT/US2011/058619, "Multi-Component Induction Logging Systems and Methods Using Real-Time OBM Borehole Correction", filed Oct. 31, 2011, 7 pgs.

PCT International Preliminary Report on Patentability, dated Oct. 11, 2012, Appl No. PCT/US2011/030145, "Multi-Step Borehole Correction Scheme for Multi-Component Induction Tools", filed Mar. 28, 2011, 6 pgs.

PCT International Preliminary Report on Patentability, dated Jan. 29, 2014, Appl No. PCT/US2011/058619, "Multi-Component Induction Logging Systems and Methods Using Real-Time OBM Borehole Correction," filed Oct. 31, 2011, 12 pgs.

Hou, Junsheng, et al., "New Scattered Potential Finite-Difference Method with Anisotropic Background to Simulate Multicomponent Induction Logs," PIERS, 2011, 12 pgs., Suzhou, China.

Zhong, Lili, et al., "Simulation of Tri-Axial Induction Logging Tools in Layered Anisotropic Dipping Formations," SEG 2006 Annual Meeting, p. 456-460, New Orleans, Louisiana.

Hou, Junsheng, et al., "Fast Finite-Difference Simulation of 3D Borehole EM Fields Using Scattered Potentials," SEG International Exposition and Annual Meeting, 2009, pp. 436-440.

(56) References Cited

OTHER PUBLICATIONS

CA Notification of Requisition by Examiner, dated May 5, 2014, Appl. No. 2,786,913, "Multi-Step Borehole Correction Scheme for Multi-Component Induction Tools," Filed Mar. 28, 2011, 3 pgs.

AU Patent Examination Report No. 1, dated Mar. 13, 2015, Appl No. 2011380527,"Multi-Component Induction Logging Systems and Methods Using Real-Time OBM Borehole Correction", Filed Oct. 31, 2011.

U.S. Non-Final Office Action, dated Jun. 16, 2015, U.S. Appl. No. 13/521,756, "Multi-Step Borehole Correction Scheme for Multi-Component Induction Tools," filed Jul. 12, 2012, 19 pgs.

EPO Supplementary Search Report, dated Jun. 26, 2015, Appl No. 11875150.2, "Multi-Component Induction Logging Systems and Methods Using Real-Time OBM Borehole Correction," filed Oct. 31, 2011, 8 pgs.

Moorkamp, Max, et al., "A framework for 3D joint inversion of MT, gravity and seismic refraction data," Geophys. J. Int., Sep. 27, 2010, 34 pgs.

GCC Examination Report, dated Apr. 17, 2016, Appl No. GC 2012-2243, "Multi-Component Induction Logging Systems and Methods Using Real-Time OBM Borehole Correction," filed Sep. 12, 2012, 8 pgs.

\* cited by examiner

MULTI-COMPONENT INDUCTION LOGGING SYSTEMS AND METHODS USING REAL-TIME OBM BOREHOLE CORRECTION

CROSS-REFERENCE TO RELATED APPLICATIONS

The present application relates to application PCT/US2011/030145, titled "Multi-step borehole correction scheme for multi-component induction tools", filed Mar. 28, 2011 by inventors Junsheng Hou and Michael Bittar. This related application is hereby incorporated herein by reference.

BACKGROUND

In the field of petroleum well drilling and logging, resistivity logging tools are frequently used to provide an indication of the electrical resistivity of rock formations surrounding an earth borehole. Such information regarding resistivity is useful in ascertaining the presence or absence of hydrocarbons. A typical resistivity logging tool includes a transmitter antenna and a pair of receiver antennas located at different distances from the transmitter antenna along the axis of the tool. The transmitter antenna is used to create electromagnetic fields in the surrounding formation. In turn, the electromagnetic fields in the formation induce an electrical voltage in each receiver antenna. Due to geometric spreading and absorption by the surrounding earth formation, the induced voltages in the two receiving antennas have different phases and amplitudes. Experiments have shown that the phase difference ($\Phi$) and amplitude ratio (attenuation, A) of the induced voltages in the receiver antennas are indicative of the resistivity of the formation. The average depth of investigation (as defined by a radial distance from the tool axis) to which such a resistivity measurement pertains is a function of the frequency of the transmitter and the distance from the transmitter to the mid-point between the two receivers. Thus, one may achieve multiple radial depths of investigation of resistivity either by providing multiple transmitters at different distances from the receiver pair or by operating a single transmitter at multiple frequencies.

Many formations are electrically anisotropic, a property which is generally attributable to extremely fine layering during the sedimentary build-up of the formation. Hence, in a formation coordinate system oriented such that the x-y plane is parallel to the formation layers and the z axis is perpendicular to the formation layers, resistivities $R_x$ and $R_y$ in directions x and y, respectively, are the same, but resistivity $R_z$ in the z direction is different from $R_x$ and $R_y$. Thus, the resistivity in a direction parallel to the plane of the formation (i.e., the x-y plane) is known as the horizontal resistivity, $R_h$, and the resistivity in the direction perpendicular to the plane of the formation (i.e., the z direction) is known as the vertical resistivity, $R_v$. The index of anisotropy, $\eta$, is defined as $\eta=[R_v/R_h]^{1/2}$.

The relative dip angle, $\theta$, is the angle between the tool axis and the normal to the plane of the formation. Resistive anisotropy and relative dip angle each have significant effects on resistivity logging tool measurements. As a result, resistivity logging systems should account for formation anisotropy and relative dip if accurate resistivity logs are to be obtained. In U.S. Pat. No. 6,163,155 ("Electromagnetic wave resistivity tool having a tilted antenna for determining the horizontal and vertical resistivities and relative dip angle in anisotropic earth formations"), Michael Bittar discloses one such approach that employs resistivity logging tools having tilted transmitter and/or receiver antennas.

Bittar and Hu further disclose certain techniques for processing measurements from such tilted antenna logging tools in applications PCT/US2006/062149 ("Antenna coupling component measurement tool having rotating antenna configuration") and PCT/US2007/064221 ("Robust inversion systems and methods for azimuthally sensitive logging tools"). The present application relates to application PCT/2011/030145 by Hou and Bittar, which presents a multi-step inversion scheme to determine measurements that have been corrected for the effect of the borehole. While providing a number of potential advantages, the multi-step inversion scheme imposes a computational resource demand that is undesirably high.

BRIEF DESCRIPTION OF THE DRAWINGS

Accordingly, there are disclosed in the drawings and the following description specific multi-component induction (MCI) logging systems and methods with an improved real-time oil-based mud borehole correction scheme to at least partly address this issue. In the drawings.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Figures 1, 2, 3:
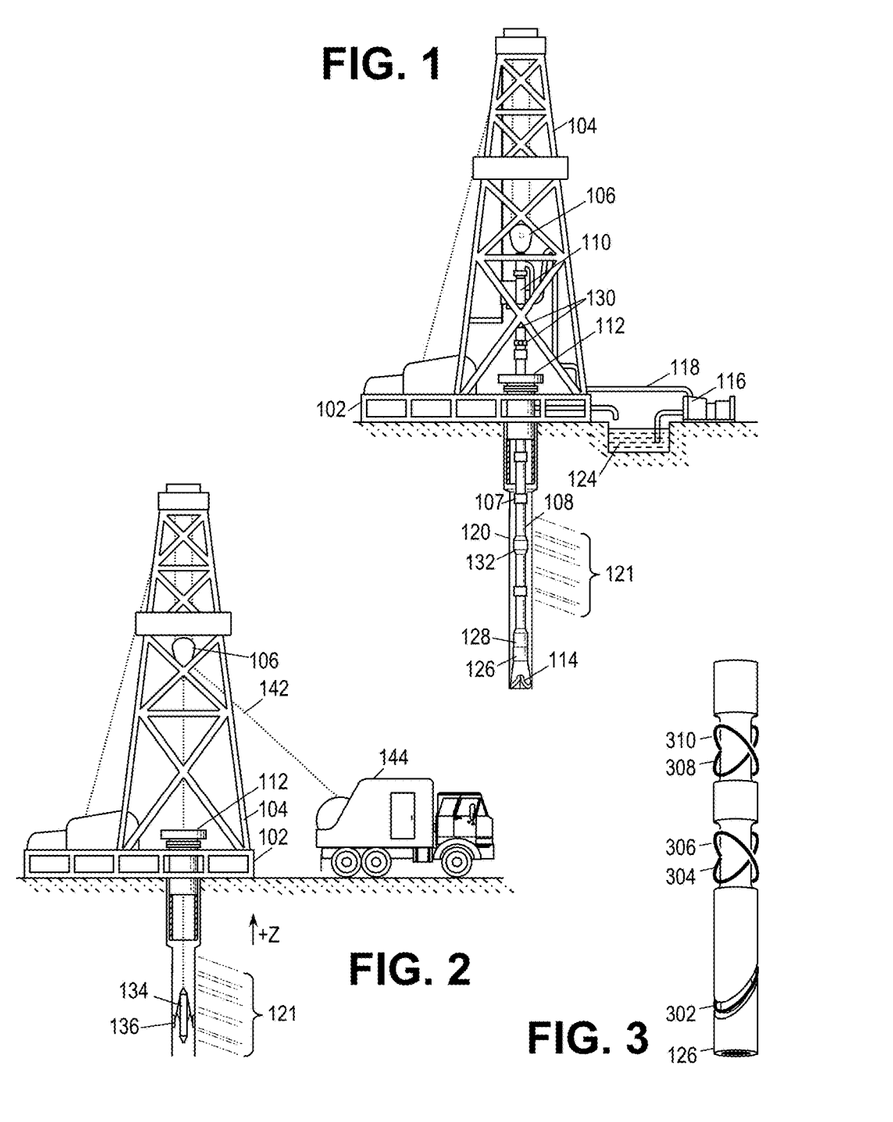
FIG. 1 shows an illustrative logging while drilling environment with dipping formation beds.
FIG. 2 shows an illustrative wireline logging environment with dipping formation beds.
FIG. 3 shows an illustrative antenna configuration for a LWD MCI logging tool.

FIG. 1 shows a suitable context for describing the operation of the disclosed systems and methods. In the illustrated logging while drilling (LWD) environment, a drilling platform 102 is equipped with a derrick 104 that supports a hoist 106 for raising and lowering a drill string 108. The hoist 106 suspends a top drive 110 that rotates the drill string 108 as the drill string is lowered through the well head 112. The drill string 108 can be extended by temporarily anchoring the drill string at the well head 112 and using the hoist 106 to position and attach new drill pipe sections with threaded connectors 107.

Connected to the lower end of the drill string 108 is a drill bit 114. As bit 114 rotates, it creates a borehole 120 that passes through various formations 121. A pump 116 circulates drilling fluid through a supply pipe 118 to top drive 110, through the interior of drill string 108, through orifices in drill bit 114, back to the surface via the annulus around drill string 108, and into a retention pit 124. The drilling fluid transports cuttings from the borehole into the pit 124 and aids in maintaining the integrity of the borehole 120.

Drilling fluid, often referred to in the industry as "mud", is often categorized as either water-based or oil-based, depending on the solvent. Oil-based muds are generally preferred for drilling through shaley formations, as water-based muds have been known to damage such formations.

A multi-component induction logging tool 126 is integrated into the bottom-hole assembly near the bit 114. The logging tool 126 may take the form of a drill collar, i.e., a thick-walled tubular that provides weight and rigidity to aid the drilling process. As the bit extends the borehole through the formations, the bottomhole assembly collects multi-component induction measurements (with tool 126) as well as measurements of the tool orientation and position, borehole size, drilling fluid resistivity, and various other drilling conditions.

The orientation measurements may be performed using an orientation indicator, which may include magnetometers, inclinometers, and/or accelerometers, though other sensor types such as gyroscopes may be used. Preferably, the orientation indicator includes a 3-axis fluxgate magnetometer and a 3-axis accelerometer. As is known in the art, the combination of those two sensor systems enables the measurement of the rotational ("toolface") angle, borehole inclination angle (aka "slope"), and compass direction ("azimuth"). In some embodiments, the toolface and borehole inclination angles are calculated from the accelerometer sensor output. The magnetometer sensor outputs are used to calculate the borehole azimuth. With the toolface, the borehole inclination, and the borehole azimuth information, multi-component induction logging tools disclosed herein can be used to steer the bit to the desirable bed.

In wells employing acoustic telemetry for LWD, downhole sensors (including multi-component induction logging tool 126) are coupled to a telemetry module 128 having an acoustic telemetry transmitter that transmits telemetry signals in the form of acoustic vibrations in the tubing wall of drill string 108. An acoustic telemetry receiver array 130 may be coupled to tubing below the top drive 110 to receive transmitted telemetry signals. One or more repeater modules 132 may be optionally provided along the drill string to receive and retransmit the telemetry signals. Of course other telemetry techniques can be employed including mud pulse telemetry, electromagnetic telemetry, and wired drill pipe telemetry. Many telemetry techniques also offer the ability to transfer commands from the surface to the bottomhole assembly, thereby enabling adjustment of the tool's configuration and operating parameters. In some embodiments, the telemetry module 128 also or alternatively stores measurements for later retrieval when the bottomhole assembly returns to the surface.

At various times during the drilling process, the drill string 108 is removed from the borehole as shown in FIG. 2. Once the drill string has been removed, logging operations can be conducted using a wireline logging tool 134, i.e., a sensing instrument sonde suspended by a cable 142 having conductors for transporting power to the tool and telemetry from the tool to the surface. A multi-component induction logging portion of the logging tool 134 may have centralizing arms 136 that center the tool within the borehole as the tool is pulled uphole. A logging facility 144 collects measurements from the logging tool 134, and includes computing facilities for processing and storing the measurements gathered by the logging tool.

FIG. 3 shows an illustrative logging while drilling tool 126 having antennas for acquiring multi-component induction logging measurements. Logging tool 126 has a tilted transmit antenna 302 and two pairs of tilted receive antennas 304, 306 and 308, 310, thereby providing four transmit-receive antenna pairings. As the tool rotates, it acquires attenuation and phase measurements of each receive antenna's response to transmit antenna 302. In certain alternative embodiments, the tool measures in-phase and quadrature-phase components of the receive signals rather than measuring amplitude and phase. In either case, these measurements are collected and stored as a function of the tool's position and rotational orientation in the borehole.

The illustrated tool has receive antennas 304 and 308 oriented parallel to the transmit antenna 302, and receive antennas 306 and 310 oriented perpendicular to the transmit antenna. In the illustrated example, each of the antennas share a common rotational orientation, with antennas 302, 304, 308 being tilted at −45° and antennas 306, 310 being tilted at +45° relative to the longitudinal tool axis. In the illustrative tool embodiments, each of the coil antennas surrounding the tool is mounted in a recess and protected by a non-conductive filler material and/or a shield having non-conducting apertures. The tool body is primarily composed of steel. The relative tool dimensions and antenna spacings are subject to a great deal of variation depending on the desired tool properties. The distance between the receive coil pairs may be on the order of 0.25 m, while the spacing of the transmit coil to the midpoint between the receiver pairs may vary from about 0.4 m to over 10 m.

Figure 4A:
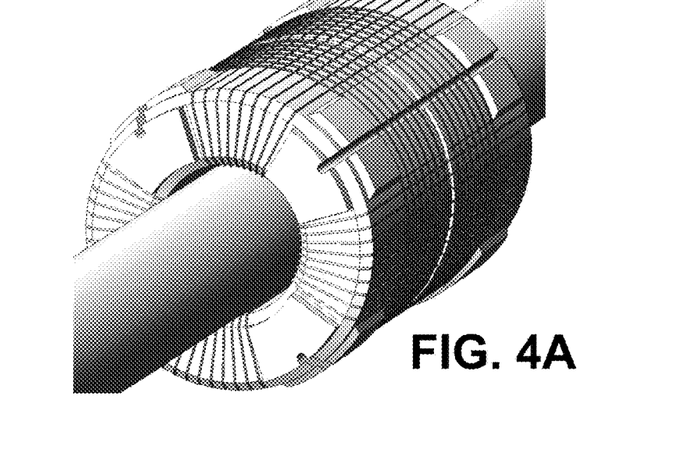
FIG. 4A shows an illustrative antenna configuration for a wireline MCI logging tool.
Figure 4B:
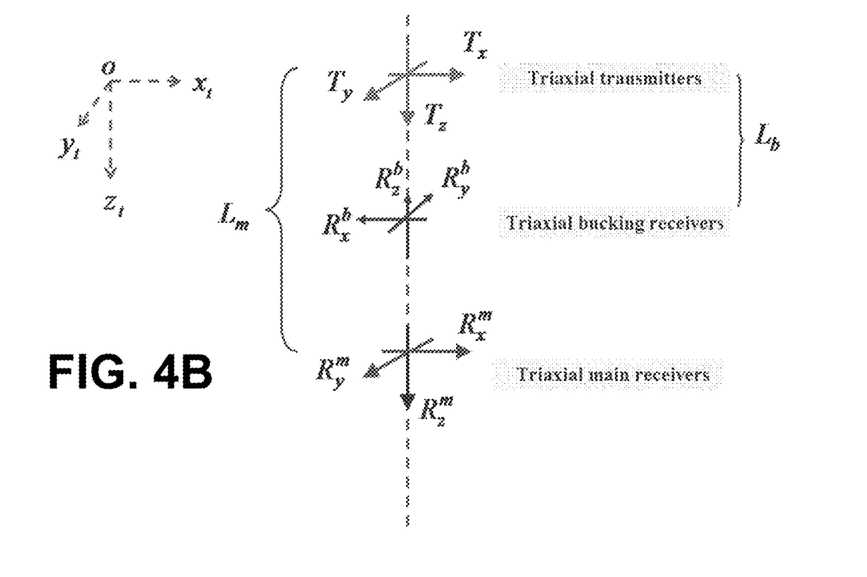
FIG. 4B shows an illustrative physical subarray model of a wireline MCI logging tool suitable for defining a measured conductivity tensor.

As disclosed in U.S. patent application Ser. No. 12/294,557 "Antenna Coupling Component Measurement Tool . . ." filed Sep. 25, 2008 by inventors Michael Bittar and David Hu, the measurements taken by a tool of this kind as it rotates enable a full set of orthogonal coupling component measurements to be obtained at each point along the borehole axis. The orthogonal coupling component measurements correspond to the tool model shown in FIGS. 4A and 4B. A triad of transmitters $T_x$, $T_y$, $T_z$, represent magnetic dipole antennas oriented parallel to the tool's x, y, and z axes respectively. A triad of main receivers $R_x^m$, $R_y^m$, $R_z^m$ similarly represent magnetic dipole antennas oriented along these axes, as do a triad of bucking receivers $R_x^b$, $R_y^b$, $R_z^b$. The main receiver triad is spaced at a distance $L_m$ from the transmitter triad, and the bucking receiver triad is spaced at a distance $L_b$ from the transmitter triad. The signal measurements of the bucking receiver triad can be subtracted from the main receiver triad to eliminate the direct signal from the transmitter and increase sensitivity to formation properties. As explained by Moran and Gianzero, in "Effects of Formation Anisotropy on Resistivity Logging Measurements" Geophysics, Vol. 44, No. 7, p. 1266 (1979), the magnetic field h in the receiver coils can be represented in terms of the magnetic moments m at the transmitters and a coupling matrix C:

$$h = C\,m \quad (1)$$

In express form, equation (1) is:

$$\begin{bmatrix} H_x \\ H_y \\ H_z \end{bmatrix} = \begin{bmatrix} C_{xx} & C_{xy} & C_{xz} \\ C_{yx} & C_{yy} & C_{zz} \\ C_{zx} & C_{zy} & C_{zz} \end{bmatrix} \begin{bmatrix} M_x \\ M_y \\ M_z \end{bmatrix}, \quad (2)$$

where $M_X$, $M_Y$, and $M_Z$ are the magnetic moments (proportional to transmit signal strength) created by transmitters $T_X$, $T_Y$, and $T_Z$, respectively. $H_X$, $H_Y$, $H_Z$ are the magnetic fields (proportional to receive signal strength) at the receiver antennas $R_X$, $R_Y$, and $R_Z$, respectively.

In the antenna configuration of FIG. 4B, if each transmitter is fired in turn, and signal measurements are made at each receiver in response to each firing, nine differential measurements ($R^m - R^b$) are obtained. These nine measurements enable the determination of a complete coupling matrix C. ($C_{IJ} = a_{IJ} V_{IJ}$, where I is the index for receiver axis x, y, z, and J is the index for transmitter axis x, y, z, $a_{IJ}$ is a constant determined by the tool design, and $V_{IJ}$ is a complex value representing the signal amplitude and phase shift measured by receiver I in response to the firing of transmitter J.) Components of the apparent conductivity tensor $\overline{\sigma}_a$ are proportional to the corresponding components of the coupling matrix. Given a coupling matrix (or conductivity tensor) for any given orientation of the tool, the system can apply rotational transformations to determine a corresponding matrix for any arbitrary tool orientation.

Figure 5:
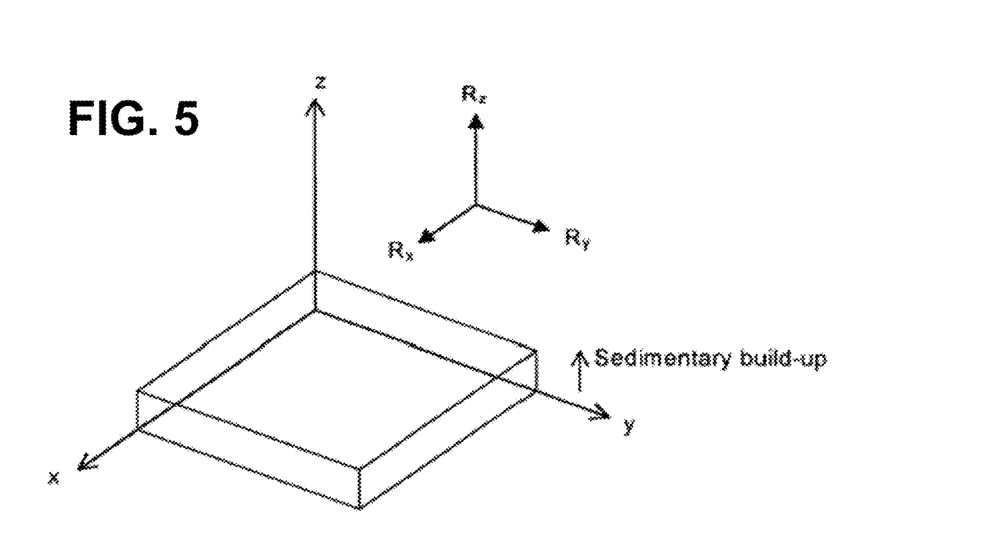
FIG. 5 is a schematic perspective view of a Cartesian coordinate system in a sedimentary earth formation.

Referring momentarily back to FIGS. 1 and 2, note that formations 121 are not perpendicular to the borehole, a situation that may occur naturally or may occur due to directional drilling operations. When measuring formation resistivity and orientation, it is convenient to use the formation coordinate system shown in FIG. 5. FIG. 5 shows a portion of a sedimentary formation bed, with the z-axis oriented perpendicular to the plane of the formation, i.e., in the direction of the sedimentary accretion. As previously mentioned, the formation resistivity when measured along this axis is often different than formation resistivity measured in the x-y plane. In a dipping bed, the x-axis may be chosen to be oriented in the direction of deepest ascent, i.e., "uphill or downhill". When the formation coordinate system is aligned in this manner, it may be termed a "strike-aligned" coordinate system.

In addition to the tool coordinate system and the formation coordinate system, a third coordinate system is employed herein. The borehole coordinate system has a z-axis that follows the central axis of the borehole. The x-axis of the borehole extends perpendicularly from the central axis through the high side of the borehole. (In a vertical borehole, the x-axis extends through the north side of the borehole.) The y-axis extends perpendicular to the other two axes in accordance with the right-hand rule.

Figure 6:
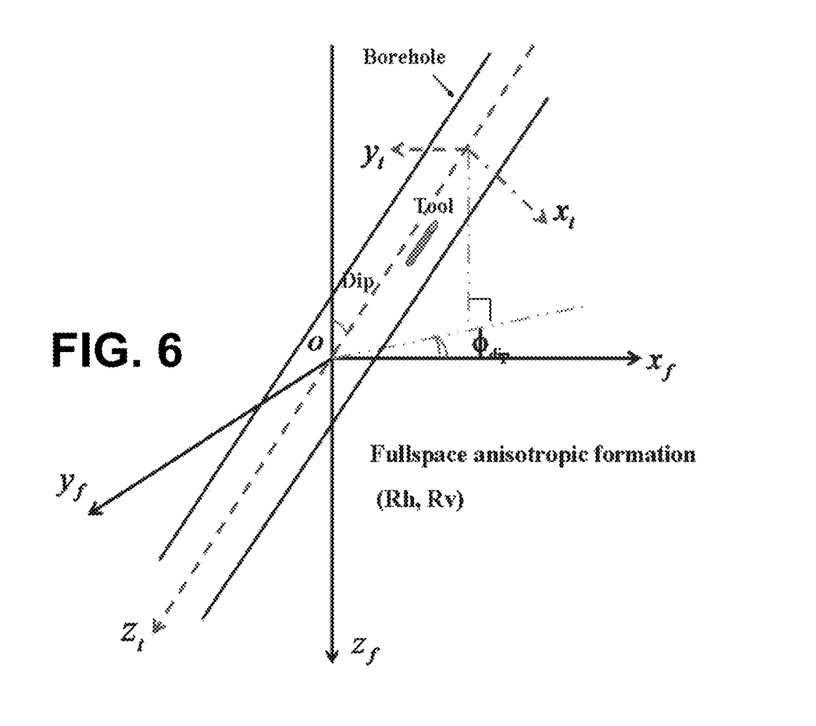
FIG. 6 shows a relationship between the coordinate systems of a tool, a borehole and a dipping formation bed.

FIG. 6 illustrates how the three coordinate systems may be related. The formation coordinate system $x_f$, $y_f$, $z_f$ is tied to the formation as explained previously, though due to symmetry the x- and y-axes can be shifted without affecting measurement of the formation properties. A borehole penetrates the formation. The angle between the formation z-axis and the central axis of the borehole is called the dip angle $\alpha$. The dip azimuth $\phi_{dip}$ is the angle between the $x_f$-axis and the projection of the borehole axis into the $x_f$-$y_f$ plane. Because of the previously mentioned symmetry, the formation $x_f$-axis can be arbitrarily positioned so that the dip azimuth dip is zero. (A side effect of this choice is that the borehole $x_b$-axis becomes contained in $x_f$-$z_f$ plane of the formation.)

Figure 7:
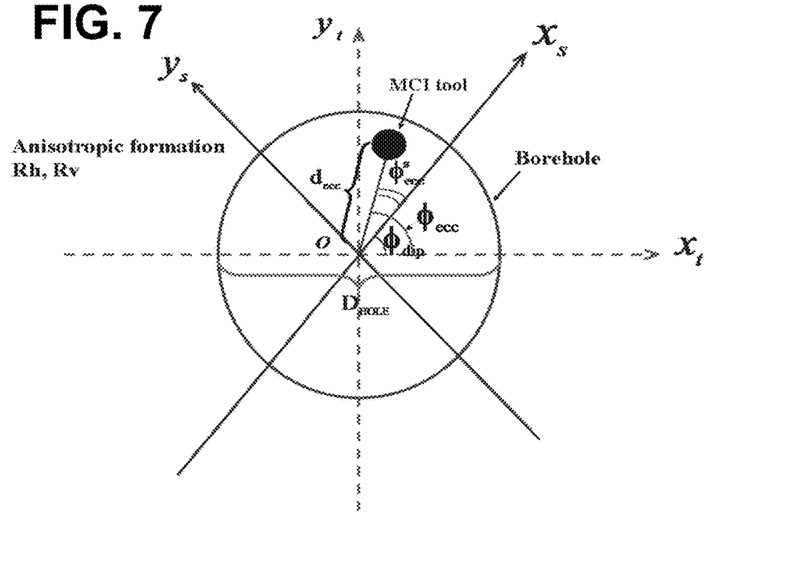
FIG. 7 shows a relationship between the coordinate systems of an eccentric tool and a borehole.

The z-axis of the tool coordinate system coincides with the z-axis of the borehole coordinate system. FIG. 7 shows a number of relationships in the plane of the tool's x- and y-axes. The dip azimuth (or "strike") $\phi_{dip}$ is the angle between the tool's x-axis and the strike-aligned formation x-axis ("$x_s$"). The eccentricity azimuth $\phi_{ecc}$ is the direction of the tool's displacement $d_{ecc}$ from the central borehole axis, relative to the tool's x-axis. When measured relative to the strike-aligned formation x-axis, the eccentricity azimuth is denoted $\phi_{ecc}^s$. The borehole diameter is $d_{hole}$.

Treating FIGS. 4-7 as the basis of a model for predicting coupling component matrix measurements, the model parameters are horizontal resistivity of the formation $R_h$ (or horizontal conductivity $\sigma_h$), vertical resistivity of the formation $R_v$ (or vertical conductivity $\sigma_v$), borehole diameter $d_{hole}$, borehole mud resistivity $R_m$, tool eccentricity displacement $d_{ecc}$, tool eccentricity azimuth $\phi_{ecc}$, relative dip angle $\alpha$, and relative dip azimuth $\phi_{dip}$. When shoulder-bed and boundary effects are ignored, the model assumes a circular borehole through an infinitely thick formation. Numerical simulations of the multi-component induction log response show that for a given array spacing and frequency, the foregoing parameters are sufficient. The coupling matrix components depend on the various parameters in different ways. For example, the $C_{zz}$ component is independent of the azimuthal angles $\phi_{ecc}$ and $\phi_{dip}$. This observation enables the size of the parameter inversion process to be reduced as illustrated in FIGS. 8A-8C.

Figure 8A:
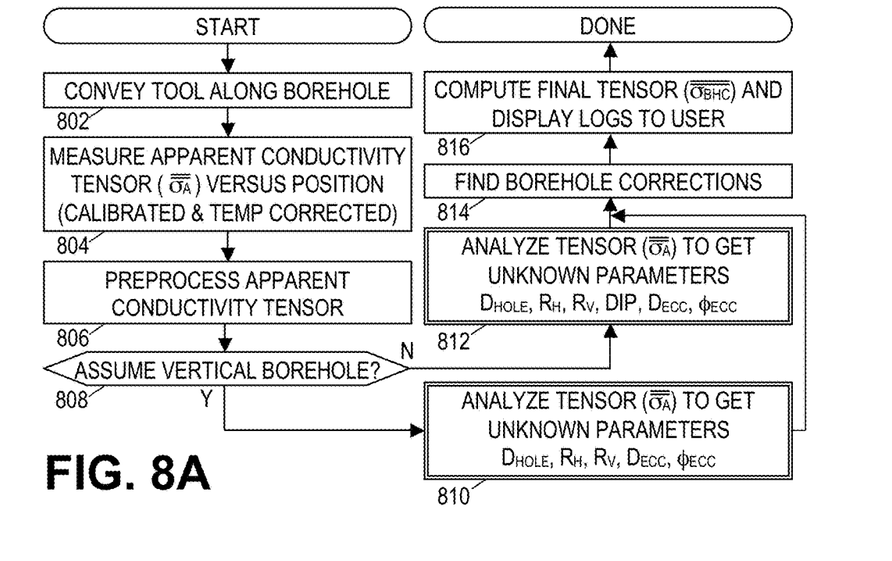
FIGS. 8A-8C provide a flow diagram of an illustrative MCI logging method that provides oil-based mud borehole corrections for a measured conductivity tensor.
Figure 8B:
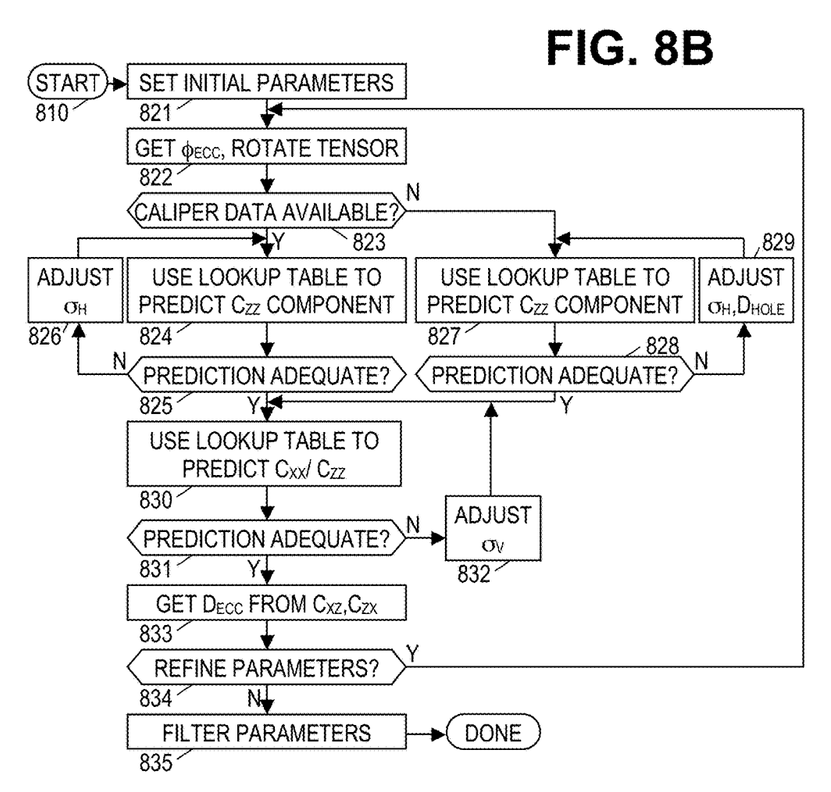
Figure 8C:
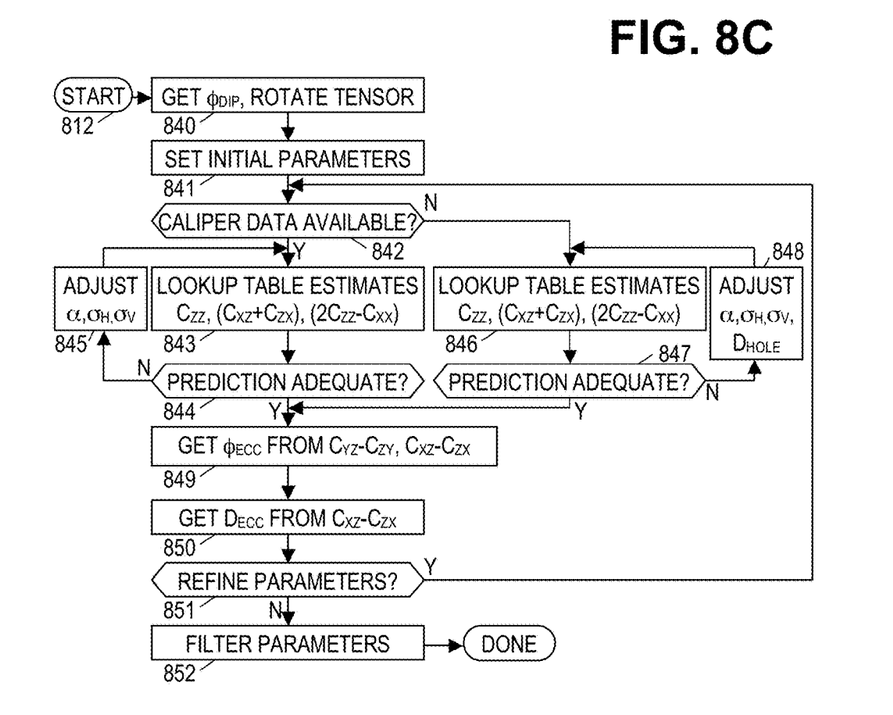

FIG. 8A is a flow diagram of an illustrative multi-component induction logging method, which may be implemented by the systems illustrated in FIGS. 1 and 2. Alternatively, systems such as those illustrated in FIGS. 1-2 may only acquire the data and communicate it to a remote workstation where the remaining portion of the illustrative method is carried out.

The logging method begins in block 802 with the conveyance of a multi-component induction logging tool along a borehole, e.g., as a wireline tool or a LWD tool. In block 804, as the tool is being conveyed along the borehole, it measures the components of the apparent conductivity tensor as a function of the tool's position in the borehole. Tool calibration and temperature correction are normally applied during or shortly after the measurements are acquired. In at least some cases, the tool sonde further includes instruments to measure borehole diameter ($d_{hole}$) and borehole fluid resistivity $R_m$. In block 806, the system preprocesses the conductivity tensor and borehole size logs. Such preprocessing can include adaptive low-pass filtering to remove high-frequency measurement noise and/or to correct for horn-effect at formation boundaries. In some cases, the boundary horns may be removed or reduced using the some combined logs as described in U.S. Pat. No. 6,819,112, titled "Method of combining vertical and horizontal magnetic dipole induction logs for reduced shoulder and borehole effects" by inventors Gianzero and Gao.

In block 808, the system determines which of two inversion processes should be applied to the acquired data: the process that assumes a vertical borehole (no relative dip) or the process that assumes a deviated borehole. Typically, such a determination would be based on input from an engineer familiar with the logged borehole, but it could alternatively be based on a review of the tool's orientation indicator logs or a previous analysis of the acquired data. For example, the system could first try one of the inversion processes and, if the results are unsatisfactory, apply the second inversion process. For vertical boreholes, block 810 is performed to determine the unknown model parameters $\sigma_H$, $\sigma_V$, $\phi_{ecc}$, $d_{ecc}$, and, where needed, $d_{hole}$. For deviated boreholes, block 812 is performed to determine $\alpha$, $\phi_{dip}$, $\sigma_H$, $\sigma_V$, $\phi_{ecc}$, $d_{ecc}$, and, where needed, $d_{hole}$.

These model parameters are then employed in block 814 to predict tool responses in models with and without a borehole. The differences between these predicted tool responses is the borehole correction which the system applies to the measured conductivity tensor in block 816. Also in block 816, one or more components of this corrected conductivity tensor is made accessible in the form of a log to a user. If desired, the conductivity tensor component logs can also be post processed by other applications to derive other formation or properties.

FIG. 8B is a flow diagram of an illustrative inversion process 810 for vertical boreholes (i.e., the relative dip between the borehole and formation is $\alpha$=0). It advantageously splits the high-dimensional inversion problem into multiple, reduced-dimension inversion steps based on the particular sensitivity of certain coupling components to individual model parameters. For example, in a vertical borehole the $C_{zz}$ component is insensitive to vertical resistivity $R_V$, and all of the direct-coupling components ($C_{zz}$, $C_{xx}$, $C_{yy}$) are relatively insensitive to tool eccentricity. The cross components $C_{xz}$, $C_{zx}$, $C_{yz}$, and $C_{zy}$ are almost linearly dependent on tool eccentricity.

The eccentricity azimuth $\phi_{ecc}$ can be solved independently of other model parameters by a coordinate rotation. Accordingly, the process in FIG. 8B begins in block 821 with setting initial estimates for the unknown model parameters $\sigma_H$, $\sigma_V$, and, where needed, $d_{hole}$. The estimates can be set randomly, or may be guesses based on previous inversion solutions (e.g., for other nearby borehole positions). Other alternatives include having typical "average" parameter values pre-programmed into the software.

In block 822, the system estimates the eccentricity azimuth $\phi_{ecc}$ using the following equation:

$$\phi_{ecc} = \arctan\left(\frac{k_{xz}}{k_{yz}} \frac{C_{yz} - C_{zy}}{C_{xz} - C_{zx}}\right) \quad (3)$$

where (in deviated boreholes) $k_{xz}$ and $k_{yz}$ are parameters that vary based on $\sigma_H$, $\sigma_V$, and dip $\alpha$. For vertical boreholes, the ratio of the parameters is approximately 1, so they can be neglected in block 822.

In block 823, the system determines whether the tool collected caliper (i.e., borehole diameter) measurements. If so, the system performs an inversion process in blocks 824-826 to determine horizontal conductivity $\sigma_H$. In block 824, the system determines the expected tool measurement for the $C_{zz}$ component based on the most recent estimates for the horizontal conductivity. (This predicted tool measurement is hereafter represented as $P_{zz}$ to distinguish it from the actual tool measurement $C_{zz}$.) A whole vector of $P_{zz}$ values can be determined along the length of the borehole for comparison with the actual tool measurements. The inversion process can be performed in parallel to simultaneously determine horizontal conductivity along the length of the borehole, or it can be done sequentially, treating each borehole position as an independent inversion problem.

In block 825, the system determines whether an acceptable value for $\sigma_H$ has been found, and if not, the estimate for $\sigma_H$ is adjusted in block 826 and the loop is repeated. In at least some embodiments, the system repeats the loop as necessary to find the value of $\sigma_H$ (within a given range of realistic values) that minimizes the error $$\varepsilon = \|\overline{W_{zz}} \cdot (\overline{P} - \overline{C_{zz}})\|^p, \quad (4)$$

where $W_{zz}$ is a vector of weights that de-emphasizes measurements near the upper and lower ends of the logged interval, and exponent p determines the measurement norm, usually 2. In other embodiments, the system repeats the loop as necessary to obtain an error value below a predetermined threshold.

If the borehole diameter measurements are not available, the system performs the inversion process in blocks 827-829 to determine both horizontal conductivity and borehole diameter. Prediction block 827 and acceptability block 828 may be essentially the same as blocks 824 and 825, respectively. Update block 829, however, adjusts not only the horizontal conductivity estimate, but also the current estimate of borehole diameter to minimize the error between the predicted and measured values of $C_{zz}$.

Once the horizontal conductivity (and possibly the borehole diameter) has been found, the system uses it in combination with the other estimated parameters to determine a predicted value in block 830. In at least some method embodiments, the predicted value is for a combination of direct coupling measurements ($C_{xx}$, $C_{yy}$, $C_{zz}$). For example, suitable combinations include:

$$P_1 = C_{xx}/C_{zz}, \quad (5a)$$

$$P_2 = 3C_{zz} - (C_{xx} + C_{yy}), \quad (5b)$$

$$P_3 = 2C_{zz} - C_{xx}, \quad (5c)$$

In block 831, the system determines whether the optimum value for $\sigma_V$ has been found, and if not, the estimate for $\sigma_V$ is adjusted in block 832. As before, the system may repeat the loop as necessary to find a realistic value of $\sigma_V$ that minimizes the error between the predicted value of the combination and the measured value of the combination.

Once both the horizontal and vertical resistivities have been found, the system determines the tool's eccentricity displacement in block 833:

$$d_{ecc} = k_0 + k_1(C_{xz} - C_{zx}) + k_2(C_{xz} - C_{zx})^2 \quad (6)$$

where $k_0$, $k_1$, and $k_2$ are parameters determined from a quadratic programming analysis of tool simulations. The parameters may be functions of horizontal and vertical conductivities and hole diameter, in which case a lookup table may be used to determine the appropriate parameters for calculating the tool's eccentricity displacement. Alternative embodiments may calculated the $d_{ecc}$ from $C_{xz}$ alone or $C_{zx}$ alone.

In block 834, the system determines whether blocks 822-834 should be repeated to refine the estimated model parameter values. In some cases, the blocks are repeated until no further change is observed in the estimated values. In block 835, a spatial filter may be applied to the $\sigma_H$, $\sigma_V$, $\phi_{ecc}$, $d_{ecc}$, estimates, e.g., averaging neighboring measurements to exploit measurement redundancy. This redundancy arises because true formation conductivities may be expected to change slowly in the absence of a bed boundary, and the tool may be expected to have some correlation in eccentricity for adjacent measurements. Consequently more accurate estimates may be obtained by applying an appropriate filter (e.g., an adaptive low pass filter) to the parameters before they are used in block 814.

The updates in each of blocks 826, 829, 832 can be done systematically (e.g., for an exhaustive search) or adaptively (e.g., in a Newton-Raphson search for a minimum value). The determinations of predicted values in each of blocks 824, 827, and 830 may preferably be done using a lookup table having pre-calculated tool responses at each of multiple grid points in the space of realistic parameter values. A fast high-dimensional spline interpolation method can be used to determine predicted responses between grid points.

FIG. 8C is a flow diagram of an illustrative inversion process 812 for deviated boreholes (i.e., the relative dip angle is nonzero). As with the process of FIG. 8B, the size of the original high-dimensional inversion problem is significantly reduced based on the particular sensitivity of certain coupling components to individual model parameters. For example, the $C_{zz}$ component is insensitive to the azimuthal angles $\phi_{ecc}$ and $\phi_{dip}$. Moreover, the long-spacing $C_{zz}$ component measurements are relatively insensitive to $d_{ecc}$, especially in oil-based muds (OBM). The $C_{xx}$ and $C_{yy}$ component measurements are also somewhat insensitive to $d_{ecc}$ in OBM, as is the quantity $(C_{xz}+C_{zx})$.

Accordingly, the process in FIG. 8C begins in block 840 with the system determining the dip azimuth using either of the following:

$$\phi_{dip} = \frac{1}{2}\arctan\left(\frac{C_{xy}+C_{yx}}{C_{xx}-C_{yy}}\right) \quad (6a)$$

$$\phi_{dip} = \arctan\left(\frac{C_{yz}+C_{zy}}{C_{xz}+C_{zx}}\right) \quad (6b)$$

Preferably, the coupling component values used to calculate the dip azimuth are those made with one of the relatively long antenna spacings and a relatively low frequencies. Once this value has been determined, the coupling component matrix may be rotated to determine the corresponding measurements for $\phi_{dip}=0$.

In block 841, the system sets initial estimates for unknown parameter values for $\phi_{ecc}$, $d_{ecc}$, $\alpha$, $\sigma_H$, $\sigma_V$, and, where needed, $d_{hole}$. As before, the estimates can be set randomly, or may be guesses based on previous inversion solutions (e.g., for other nearby borehole positions). Other alternatives include having typical "average" parameter values pre-programmed into the software.

In block 842, the system determines whether the tool collected caliper (i.e., borehole diameter) measurements. If so, the system performs an inversion process in blocks 843-845 to determine dip $\alpha$, horizontal conductivity $\sigma_H$, and vertical conductivity $\sigma_V$. In block 843, the system determines the expected tool measurement for $C_{zz}$, $(C_{xz}+C_{zx})$, and $(C_{xx}+C_{yy})$. This last value can be replaced with an estimation of $(2C_{zz}-C_{xx})$ or $[3C_{zz}-(C_{xx}+C_{yy})]$. These values provide the desired sensitivity to $\alpha$, $\sigma_H$, $\sigma_V$, and $d_{hole}$. In block 844, the system compares the predicted values to the measured values and, if they do not adequately match, the system updates the estimates for $\alpha$, $\sigma_H$, and $\sigma_V$ to reduce the error in block 845.

If the borehole diameter measurements are not available, the system performs the inversion process in blocks 846-848 to determine $\alpha$, $\sigma_H$, $\sigma_V$, and $d_{hole}$. Prediction block 846 and acceptability block 847 may be essentially the same as blocks 843 and 844, respectively. Update block 848, however, adjusts not only the estimates of $\alpha$, $\sigma_H$, and $\sigma_V$, but also the current estimate of borehole diameter to minimize the mismatch between the predicted and measured values of $C_{zz}$, $(C_{xz}+C_{zx})$, and $(C_{xx}+C_{yy})$.

Once an acceptable match between predicted and measured responses have been found, the system determines the eccentricity azimuth $\phi_{ecc}$ in block 849:

$$\phi_{ecc} = \arctan\left(\frac{k_{xz}}{k_{yz}}\frac{C_{yz}-C_{zy}}{C_{xz}-C_{zx}}\right) + \phi_{dip} \quad (7)$$

where (in deviated boreholes) $k_{xz}$ and $k_{yz}$ are parameters that vary based on $\sigma_H$, $\sigma_V$, and dip $\alpha$. Preferably, the coupling component measurements used to determine the eccentricity azimuth are those made with a relatively short antenna spacing (e.g., 17 inch or 29 inch) and a relatively high frequency (e.g., 36 kHz or 72 kHz).

In block 850, the system determines the eccentricity displacement using either of the following:

$$d_{ecc} = -\frac{C_{xz}-C_{zx}}{k_{xz}\cos(\phi_{ecc})} \quad (8a)$$

$$d_{ecc} = -\frac{C_{yz}-C_{zy}}{k_{yz}\sin(\phi_{ecc})} \quad (8b)$$

In block 851, the system determines whether blocks 842-851 should be repeated to refine the estimated model parameter values. In some cases, the blocks are repeated until no further change is observed in the estimated values. In block 852, a spatial filter may be applied to the $\sigma_H$, $\sigma_V$, $\phi_{ecc}$, $d_{ecc}$, estimates, e.g., averaging neighboring measurements to exploit measurement redundancy. The model parameter values are then passed to block 814 (FIG. 8a).

Figure 9:
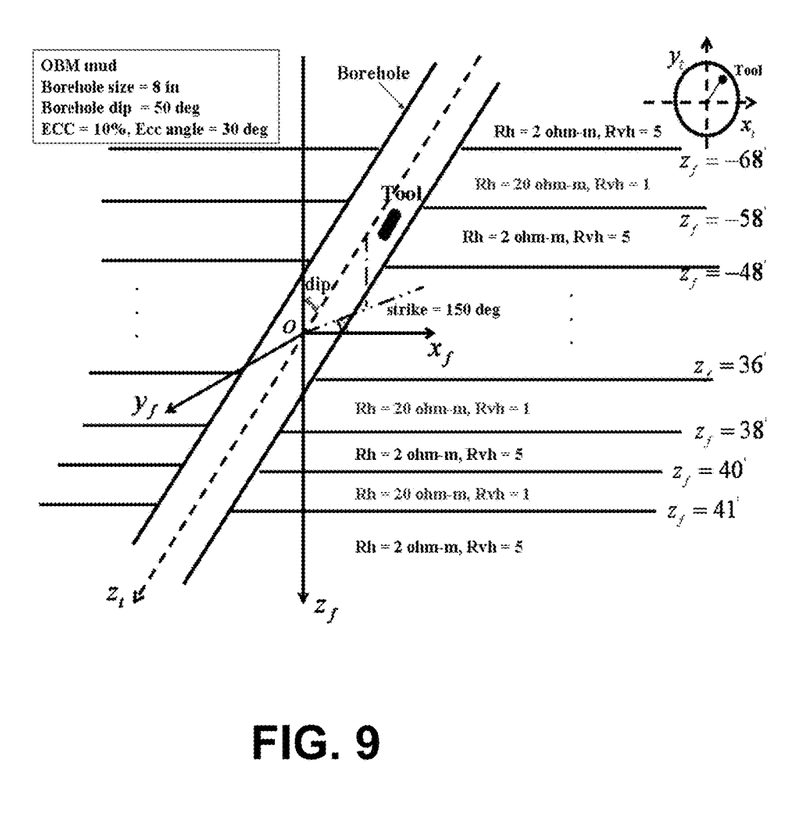
FIG. 9 shows an illustrative test geometry.

FIG. 9 shows a formation model that is used below to verify the methods disclosed above. FIG. 9 shows a sequence of formation layers of gradually decreasing thickness, alternating between a conductive, anisotropic layer ($R_h$=2 Ωm, $R_v$=5$R_h$) and a more resistive, isotropic layer ($R_h$=2 Ωm, $R_v$=$R_h$). The first two layers are 10 feet thick, the next two are 9 feet thick, then 8', 7', 6', . . . , 1'. An eight inch borehole penetrates the formations at a relative dip angle of 50°, with a dip azimuth of 150°. The eccentricity displacement of the tool is assumed to be 10% of the borehole diameter at an azimuth of 30°. The assumed mud resistivity $R_m$ is 1000 Ωm (or OBM). The simulated logging tool includes triaxial sub-arrays (transmitter-receiver separations of 17" and 80") each operated at 72 kHz. The model assumes no invasion of borehole fluid into the formation. The simulated nine-component tool responses were determined using a full three-dimensional finite difference algorithm based on EM scattered-potential formulas (J. Hou and M. Bittar, "Fast finite-difference simulation of 3D borehole EM fields using scattered potentials", SEG 79th Ann. Mtg, 2009, and J. Hou et. al., "New scattered potential finite-difference method with anisotropic background to simulate multicomponent induction logs", PIERS 2011 in Suzhou, China). To validate the disclosed borehole-correction scheme, a semi-analytical electromagnetic solution for 1D layered anisotropic media was used for producing the tool responses (L. Zhong, L. Shen, S. Li, R. Liu, M. Bittar, and G. Hu, "Simulation of tri-axial induction logging tools in layered anisotropic dipping formations", SEG 76th Ann. Mtg, 2006).

Figure 10:
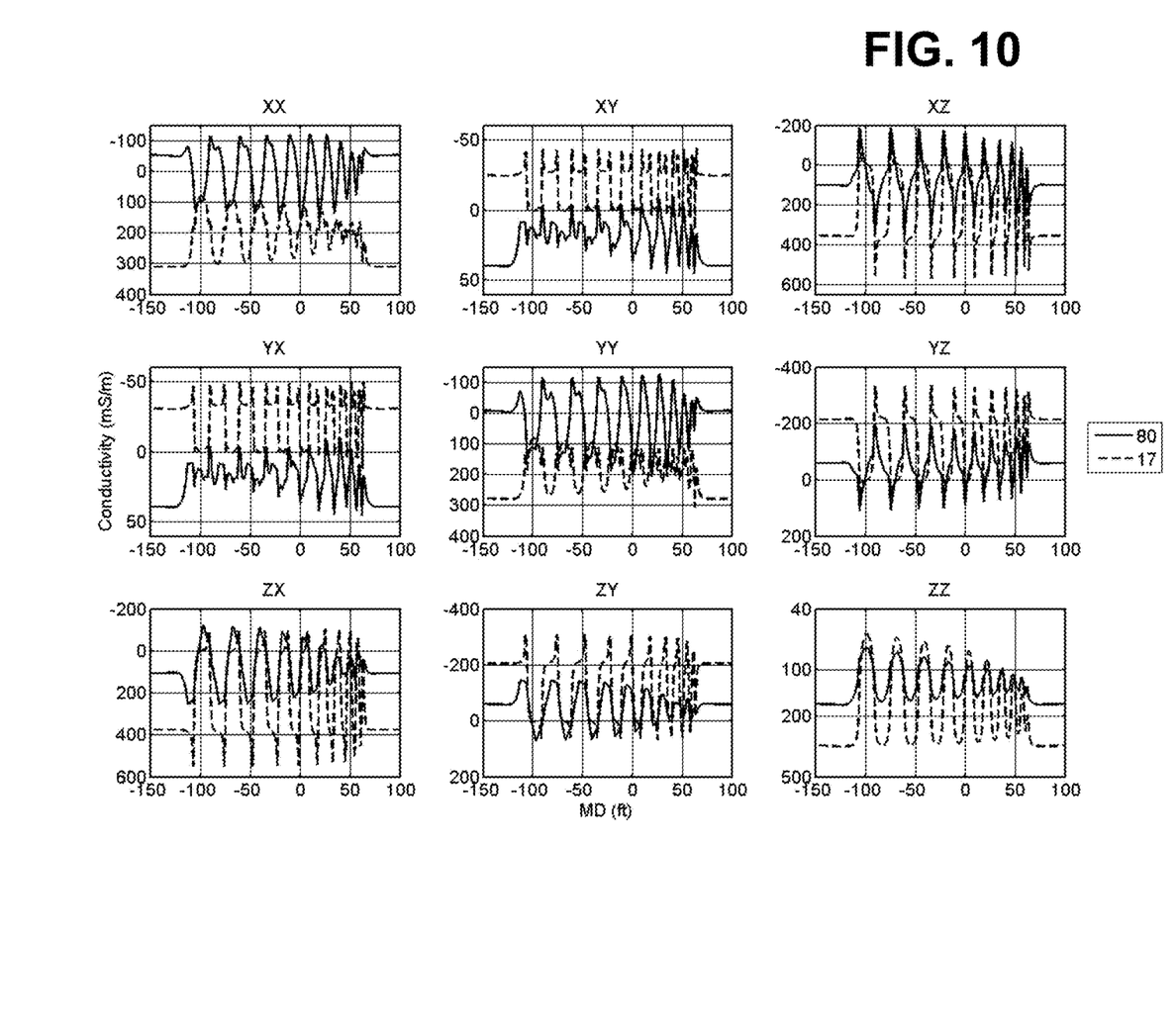
FIG. 10 shows simulated measurements of the 17-in and 80-in subarrays for the test geometry.
Figure 11:
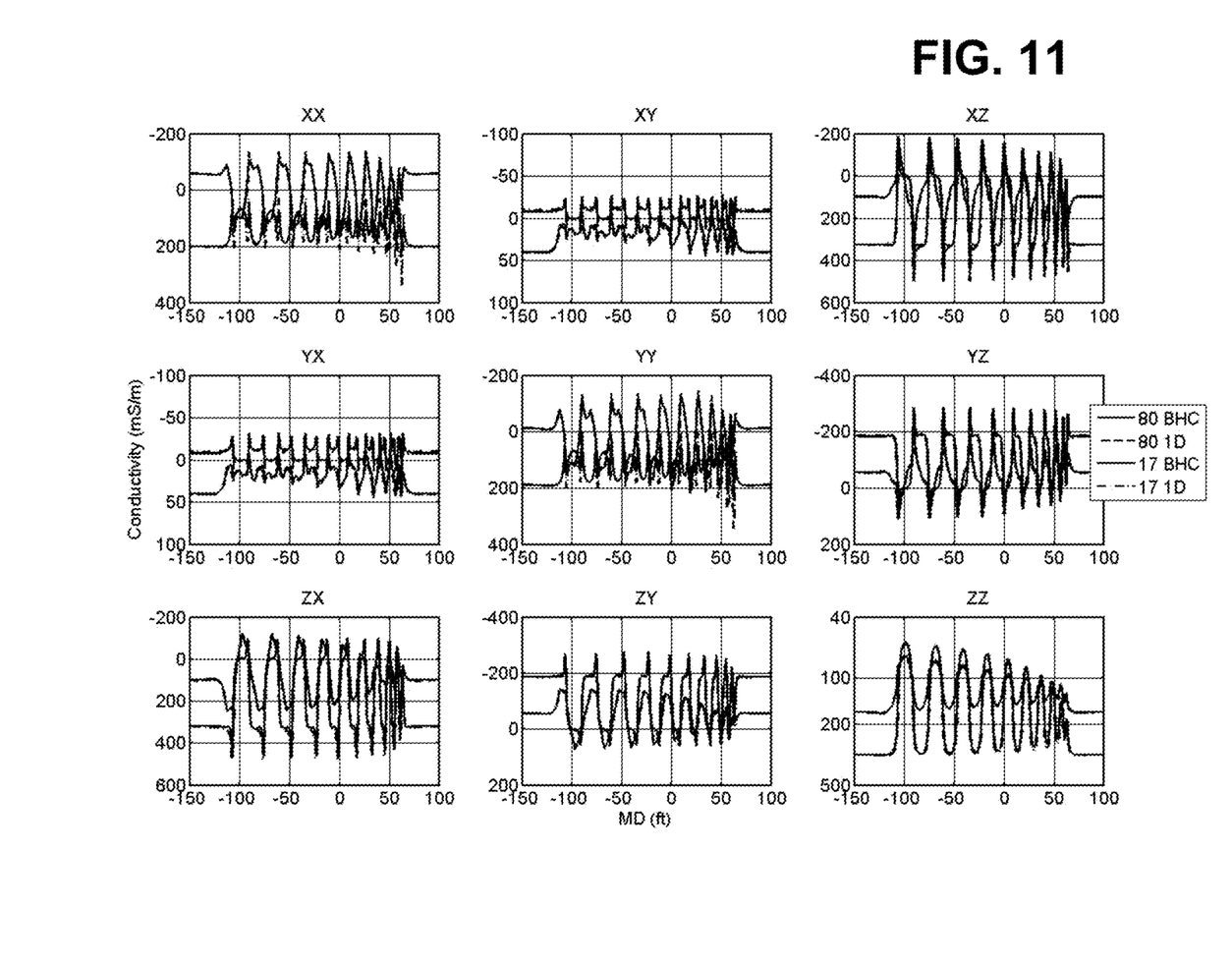
FIG. 11 shows their borehole-corrected measurements for the test geometry.
Figure 12:
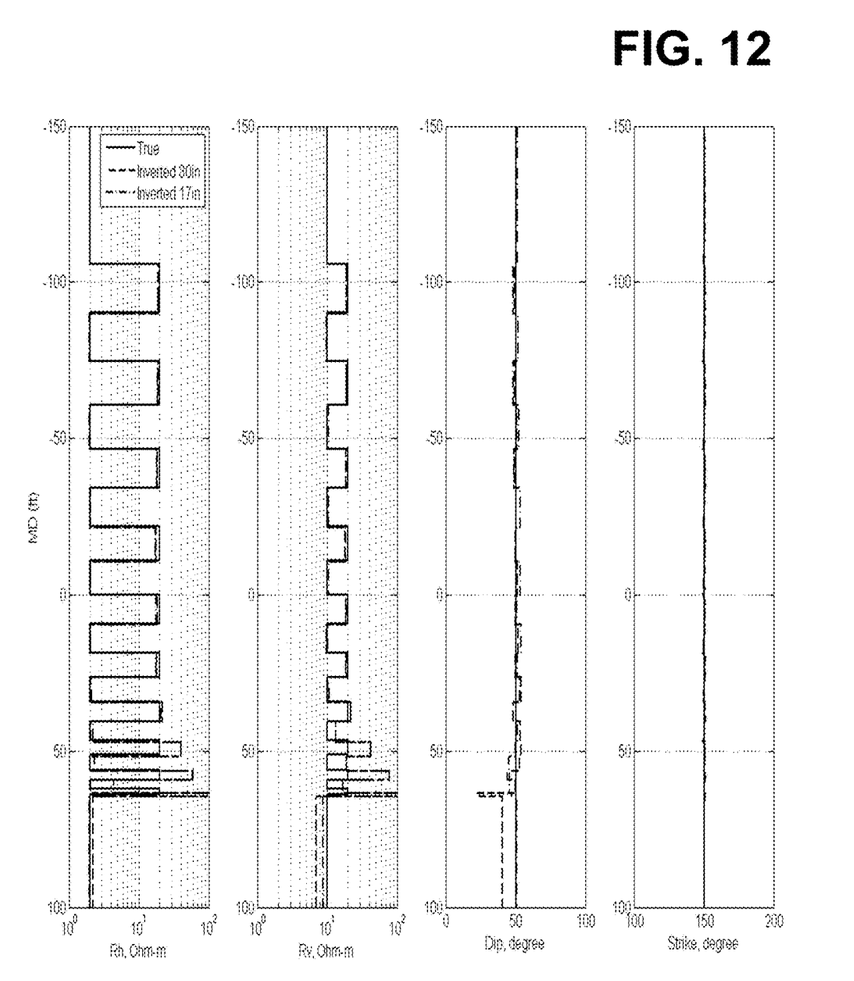
FIG. 12 shows illustrative inversion parameters for the test geometry using vertical one-dimensional inversion for the borehole-corrected data.

FIG. 10 shows the raw tool responses simulated for the model, while FIG. 11 shows the corresponding borehole corrected responses determined using the method of FIGS. 8A-8C. FIG. 11 also shows the simulated response curves for the 1D model without a borehole—demonstrating a close match with the borehole-corrected responses. FIG. 12 shows the inverted parameters $R_h$, $R_v$, dip α and dip azimuth $\phi_{dip}$ ("strike") from the vertical 1D inversion of the MCI measurements. The dip azimuth is consistently and accurately determined. The dip angle is determined consistently and correctly from the 17-in responses, while the 80-in response yields accurate results nearly everywhere except in the neighborhood of the thinnest layers. The resistivities are accurately determined for all layers thicker than 3 feet. Though there is an increasing discrepancy in the resistivity values for the thinner layers, the response curves nevertheless distinguish the layers clearly and with good spatial resolution.

Thus the disclosed real-time borehole correction system for processing multi-component induction logging data is expected to perform well. The inversion algorithm is implemented by reducing the original inversion problem of one high-dimension unknown vector into a lower-dimension inversion supplemented with analytical determinations of those parameters that can be accurately estimated individually. Numerical tests show this approach reduces the computational complexity of the BHC inversion overall, and increases the robustness and reliability of the results.

Other contemplated tools include antenna spacings of 6", 10", 17", 29", 50" and 80", with each operating at five frequencies: 12 kHz, 36 kHz, 60 kHz, 72 kHz, and 84 kHz. To expedite the computation, the foregoing inversion can be performed individually for each antenna spacing and frequency. Where greater accuracy is desired for the estimated formation parameter values, particularly where borehole fluid invasion may be expected, the measurements at different frequencies and spacings may be combined as part of the inversion process.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A logging method for determining a boundary between a first formation and a second formation that comprises:
    conveying a logging tool into a borehole, wherein the logging tool comprises:
        a longitudinal tool axis and a perpendicular tool axis,
        a tilted transmit antenna, wherein the titled transmit antenna produces an electromagnetic field;
        a tilted receive antenna, which receives a transmitter receiver coupling measurements that include at least direct coupling along a longitudinal tool axis (Czz), direct coupling along a perpendicular axis (Cxx), and cross coupling along the longitudinal and a perpendicular axes (Cxz);
    transmitting an electromagnetic field into a formation with a tilted transmit antenna;
    measuring the transmitter receiver coupling between the tilted transmit antenna and the tilted receive antenna;
    combining a plurality of the coupling measurements to obtain an inversion parameter;
    performing an inversion process to determine a vertical conductivity based at least in part on the inversion parameter;
    determining borehole corrections by multi-component induction logging data from said multi-component transmitter receiver coupling measurements based at least in part on said vertical conductivity;
    displaying a log based at least in part on at least one of said borehole corrections; and
    displaying a boundary between a first formation and a second formation.

2. The method of claim 1, wherein the inversion parameter is in a set consisting of Cxx/Czz, 2Czz-Cxx, and 3Czz-(Cxx+Cyy).

3. The method of claim 1, wherein the inversion parameter is in a set consisting of Cxz+Czx and Cxx+Cyy.

4. The method of claim 3, wherein the inversion process further determines horizontal conductivity and dip, and wherein the inversion process is further based on Czz and at least one of 2Czz-Cxx and 3Czz-(Cxx+Cyy).

5. The method of claim 4, further comprising determining borehole diameter as part of said inversion process if the borehole diameter was not measured by the logging tool.

6. The method of claim 4, further comprising determining an eccentricity azimuth based at least in part on the ratio (Cyz-Czy)/(Cxz-Czx).

7. The method of claim 6, further comprising adjusting the ratio based at least in part on an estimate value of dip, horizontal conductivity, or vertical conductivity.

8. The method of claim 6, further comprising determining an eccentricity displacement based at least in part on the difference (Cxz-Czx).

9. The method of claim 1, further comprising processing the coupling measurements to reduce a horn effect before performing the inversion process.

10. The method of claim 1, wherein the vertical conductivity is determined as a function of borehole position, and wherein the method further comprises applying a spatial filter to the vertical conductivity before determining the borehole corrected values.

11. The method of claim 2, further comprising:
    determining that an expected dip angle is near zero; and
    inverting a Czz component to determine a horizontal conductivity before performing said inversion process to determine a vertical conductivity.

12. The method of claim 11, further comprising estimating an eccentricity displacement based on a quadratic function of Cxz and Czx.

13. A logging system that comprises:
    a logging tool having a longitudinal tool axis and a perpendicular tool axis, the tool having an antenna arrangement that provides, as a function of tool position in a borehole, transmitter receiver coupling measurements that include at least direct coupling along the longitudinal tool axis (Czz), direct coupling along the perpendicular axis (Cxx), and cross coupling along the longitudinal and perpendicular axes (Cxz);
    at least one processor that:
        combines a plurality of the coupling measurements to obtain an inversion parameter performs an inversion process to determine a vertical conductivity based at least in part on the inversion parameter;
        determines borehole corrections by multi-component induction logging data from said transmitter-receiver coupling measurements based at least in part on said vertical conductivity;
        provides a log based at least in part on at least one of said borehole corrections; and
        provides a display of a boundary between a first formation and a second formation.

14. The system of claim 13, wherein the processor is coupled to a user interface to display said log.

15. The system of claim 13, wherein the inversion parameter is in a set consisting of Cxx/Czz, 2Czz−Cxx, and 3Czz−(Cxx+Cyy).

16. The system of claim 13, wherein the inversion parameter is in a set consisting of Cxz+Czx and Cxx+Cyy.

17. The system of claim 16, wherein the inversion process further determines horizontal conductivity and dip, and wherein the inversion process is further based on Czz and at least one of 2Czz−Cxx and 3Czz−(Cxx+Cyy).

18. The system of claim 17, wherein the at least one processor further determines a borehole diameter as part of said inversion process if the borehole diameter was not measured by the logging tool.

19. The system of claim 17, wherein the at least one processor further determines an eccentricity azimuth based at least in part on the ratio (Cyz−Czy)/(Cxz−Czx).

20. The system of claim 19, wherein the at least one processor adjusts the ratio based at least in part on an estimated value of dip, horizontal conductivity, or vertical conductivity.

21. The system of claim 19, wherein the at least one processor further determines an eccentricity displacement based at least in part on the difference (Cxz−Czx).

22. The system of claim 15, wherein the at least one processor further determines whether an expected dip angle is near zero, and if so, inverts a Czz component to determine a horizontal conductivity before performing said inversion process to determine the vertical conductivity.

23. The system of claim 22, wherein the at least one processor further estimates an eccentricity displacement based on a quadratic function of Cxz and Czx.

24. A logging system that comprises:
a logging tool having a longitudinal tool axis and a perpendicular tool axis, the tool having an antenna arrangement that provides, as a function of tool position in a borehole, transmitter receiver coupling measurements that include at least direct coupling along the longitudinal tool axis (Czz), direct coupling along the perpendicular axis (Cxx), and cross coupling along the longitudinal and perpendicular axes (Cxz);
at least one processor that:
combines a plurality of the coupling measurements to obtain an inversion parameter performs an inversion process to determine a vertical conductivity based at least in part on the inversion parameter, wherein the inversion parameter is in a set consisting of Cxx/Czz, 2Czz−Cxx, and 3 Czz−(Cxx+Cyy);
determines borehole corrections by multi-component induction logging data from said transmitter-receiver coupling measurements based at least in part on said vertical conductivity;
provides a log based at least in part on at least one of said borehole corrections;
provides a display of a boundary between a first formation and a second formation; and
a user interface which is coupled to the at least one processor to display said log.

\* \* \* \* \*